(12) United States Patent
Kim et al.

(10) Patent No.: US 12,214,669 B2
(45) Date of Patent: Feb. 4, 2025

(54) POWER TRAIN FOR VEHICLE

(71) Applicants: Hyundai Motor Company, Seoul (KR); Kia Corporation, Seoul (KR)

(72) Inventors: Jin Ho Kim, Suwon-si (KR); Yong Hwan Choi, Seoul (KR); Joo Hang Lee, Yongin-si (KR); Yong Hoo Kim, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 321 days.

(21) Appl. No.: 17/830,728

(22) Filed: Jun. 2, 2022

(65) Prior Publication Data
US 2023/0022828 A1 Jan. 26, 2023

(30) Foreign Application Priority Data
Jul. 22, 2021 (KR) .................... 10-2021-0096515

(51) Int. Cl.
*B60K 6/40* (2007.10)
*B60K 6/36* (2007.10)
*B60K 6/442* (2007.10)
*B60K 6/547* (2007.10)
*F16H 57/00* (2012.01)
*F16H 59/44* (2006.01)

(52) U.S. Cl.
CPC .................. *B60K 6/40* (2013.01); *B60K 6/36* (2013.01); *B60K 6/442* (2013.01); *B60K 6/547* (2013.01); *F16H 57/0018* (2013.01); *F16H 59/44* (2013.01); *B60Y 2200/92* (2013.01)

(58) Field of Classification Search
CPC . B60K 6/40; B60K 6/36; B60K 6/442; B60K 6/547; F16H 57/0018; F16H 59/44
See application file for complete search history.

(56) References Cited

U.S. PATENT DOCUMENTS

| | | | |
|---|---|---|---|
| 8,979,704 B2 * | 3/2015 | Kaltenbach | B60W 30/19 |
| | | | 74/330 |
| 2010/0197436 A1 * | 8/2010 | Ideshio | B60W 10/08 |
| | | | 475/8 |
| 2014/0162824 A1 | 6/2014 | Choi et al. | |
| 2015/0377327 A1 * | 12/2015 | Lee | B60K 6/365 |
| | | | 180/65.23 |
| 2016/0033014 A1 * | 2/2016 | Lee | F16H 3/728 |
| | | | 180/65.23 |

(Continued)

FOREIGN PATENT DOCUMENTS

KR 20140080638 A 7/2014

*Primary Examiner* — Erez Gurari
(74) *Attorney, Agent, or Firm* — SLATER MATSIL, LLP (57) ABSTRACT

An embodiment power train for a vehicle includes a first input shaft configured to receive rotating forces from a first motor and an engine, a second input shaft configured to receive a rotating force from a second motor, an output shaft disposed in parallel with the first input shaft and the second input shaft, a transmission gear set in which a plurality of gear sets having different gear ratios are engaged with and coupled to the first input shaft and the output shaft, a shifting unit configured to select a gear set of the plurality of gear sets based on a traveling speed of the vehicle, and a motor-side transfer gear set engaged with and coupled to the second input shaft and the output shaft.

17 Claims, 4 Drawing Sheets

(56) References Cited

U.S. PATENT DOCUMENTS

| | | | |
|---|---|---|---|
| 2017/0050636 A1* | 2/2017 | Shibata | B60K 6/365 |
| 2017/0217298 A1* | 8/2017 | Hao | B60K 6/445 |
| 2022/0009478 A1* | 1/2022 | Chae | B60W 10/02 |
| 2022/0118845 A1* | 4/2022 | Mu | B60W 20/13 |

* cited by examiner

| MODE | INTERMITTENT ELEMENT | | | FIRST MOTOR (EM1) | SECOND MOTOR (EM2) | ENGINE (E) |
|---|---|---|---|---|---|---|
| | LOW STAGE | N | HIGH STAGE | | | |
| EV | | ● | | 0 | + | 0 |
| Parallel low | ● | | | 0 | + | + |
| Parallel high | | | ● | 0 | + | + |
| Series | | ● | | + | + | + |
| Engine low | ● | | | 0 | 0 | + |
| Engine high | | | ● | 0 | 0 | + |

POWER TRAIN FOR VEHICLE

CROSS-REFERENCE TO RELATED APPLICATIONS

This application claims the benefit of Korean Patent Application No. 10-2021-0096515, filed on Jul. 22, 2021, which application is hereby incorporated herein by reference.

TECHNICAL FIELD

The present disclosure relates to a power train for a vehicle.

BACKGROUND

Typical structures of hybrid electric vehicles (HEVs) include transmission mounted electric devices (TMEDs), power splits, series-parallel multi-modes, and the like.

The TMED type is a P2 system consisting of an engine-motor-automatic transmission (AT) and has a structure implementing an engine mode six-speed, an HEV mode six-speed, and an EV mode six-speed by adding a motor and an engine clutch to a six-speed AT. A typical structure of the power split includes THS of Toyota, and a typical structure of the series-parallel multimode includes i-MMD of Honda.

Meanwhile, in the case of a traction motor of which a torque is decreased as a vehicle speed is increased above a certain vehicle speed, when a gear ratio is increased so as to increase a low-speed driving force in an HEV parallel mode, it may be difficult to use the HEV parallel mode at the highest vehicle speed of a vehicle.

In contrast, when a final reduction gear ratio is decreased, a parallel mode is possible at the highest vehicle speed, whereas a driving force required for starting at a low speed is reduced.

Therefore, in order to satisfy both the low-speed driving force and the highest vehicle speed with only performance of a motor, it is necessary to implement the driving force in a wide revolution per minute (RPM) range by forming the engine in a multi-stage manner.

The foregoing is intended merely to aid in the understanding of the background of the present disclosure, and is not intended to mean that the present disclosure falls within the purview of the related art that is already known to those skilled in the art.

SUMMARY

The present disclosure relates to a power train for a vehicle. Particular embodiments relate to a power train for a vehicle in which a transmission structure is simplified and an engine is formed in a multi-stage manner to improve driving performance of a vehicle, to reduce a size of a motor, and to improve fuel efficiency.

Accordingly, embodiments of the present disclosure have been made keeping in mind problems occurring in the related art, and embodiments of the present disclosure provide a power train for a vehicle, in which a transmission structure is simplified and an engine is formed in a multi-stage manner to improve driving performance of a vehicle, to reduce a size of a motor, and to improve fuel efficiency.

According to one embodiment, there is provided a power train for a vehicle, which includes a first input shaft which receives rotating forces from a first motor and an engine, a second input shaft which receives a rotating force from a second motor, an output shaft disposed to be parallel to the first input shaft and the second input shaft, a transmission gear set in which a plurality of gear sets having different gear ratios are engaged with and coupled to the first input shaft and the output shaft, and a gear set suitable for a traveling speed is selected by a shifting unit, and a motor-side transfer gear set engaged with and coupled to the second input shaft and the output shaft.

The first input shaft formed as a solid shaft may be inserted into the second input shaft formed as a hollow shaft, and the first input shaft and the second input shaft may be coaxially provided.

A first motor may be directly connected to one end of the first input shaft, and the second motor may be directly connected to one end of the second input shaft so that the first motor and the second motor may be disposed in one direction.

An input gear of the motor-side transfer gear set may be directly connected to the second input shaft, and an output gear of the motor-side transfer gear set may be directly connected to the output shaft.

An engine output shaft fixed to the engine may be engaged with and coupled to the other end of the first input shaft by an engine-side transfer gear set.

An input gear of the engine-side transfer gear set may be directly connected to the engine output shaft, and an output gear of the engine-side transfer gear set may be directly connected to the first input shaft.

The transmission gear set may include a low gear set engaged with and coupled to the first input shaft and the output shaft, and a high gear set configured to form a gear ratio that is smaller than a gear ratio of the low gear set and engaged with and coupled to the first input shaft and the output shaft, wherein the shifting unit may be fixed to the first input shaft and may be selectively engaged with the input gear of the low gear set and the input gear of the high gear set.

One of the output gears directly connected to the output shaft may be engaged with and coupled to a ring gear of a differential.

The output gear of the high gear set may be engaged with and coupled to the ring gear of the differential.

The first motor may be disposed on one side of the second motor, the motor-side transfer gear set may be disposed on the other side of the second motor, the engine may be connected to the other end of the first input shaft, and the transmission gear set may be disposed between the motor-side transfer gear set and the engine.

BRIEF DESCRIPTION OF THE DRAWINGS

The above and other objects, features and other advantages of embodiments of the present disclosure will be more clearly understood from the following detailed description when taken in conjunction with the accompanying drawings, in which.

DETAILED DESCRIPTION OF ILLUSTRATIVE EMBODIMENTS

Specific structural and functional descriptions of embodiments of the present disclosure disclosed in this disclosure or application are illustrative only for the purpose of describing the embodiments, and the embodiments according to the present disclosure may be implemented in various forms and should not be construed as being limited to embodiments described in this disclosure or application.

The embodiments according to the present disclosure may be variously modified and may have various forms, so that specific embodiments will be illustrated in the drawings and will be described in detail in this disclosure or application. It should be understood, however, that it is not intended to limit the embodiments according to the concept of the present disclosure to specific disclosure forms, but it includes all modifications, equivalents, and alternatives falling within the spirit and scope of the present disclosure.

The terms first, second, and the like may be used to describe various components, but the components should not be limited by these terms. These terms may be used only for the purpose of distinguishing one component from another component, and, for example, a first component may be referred to as a second component, and similarly, the second component may also be referred to as the first component without departing from the scope of the present disclosure.

When a component is referred to as being "connected" or "coupled" to another component, it may be directly connected or coupled to another component, but it should be understood that yet another component may exist between the component and another component. On the contrary, when a component is referred to as being "directly connected" or "directly coupled" to another, it should be understood that still another component may not be present between the component and another component. Other expressions describing the relationship between components, that is, "between" and "immediately between," or "adjacent to" and "directly adjacent to" should also be construed as described above.

The terms used herein are for the purpose of describing only specific embodiments and are not intended to limit the present disclosure. Unless the context clearly dictates otherwise, the singular form includes the plural form. In this disclosure, the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

Unless defined otherwise, all terms including technical or scientific terms used herein have the same meaning as commonly understood by those skilled in the art to which the present disclosure pertains. General terms that are defined in a dictionary shall be construed to have meanings that are consistent in the context of the relevant art, and will not be interpreted as having an idealistic or excessively formalistic meaning unless clearly defined in this disclosure.

Exemplary embodiments of the present disclosure will be described below with reference to the accompanying drawings.

Figure 1:
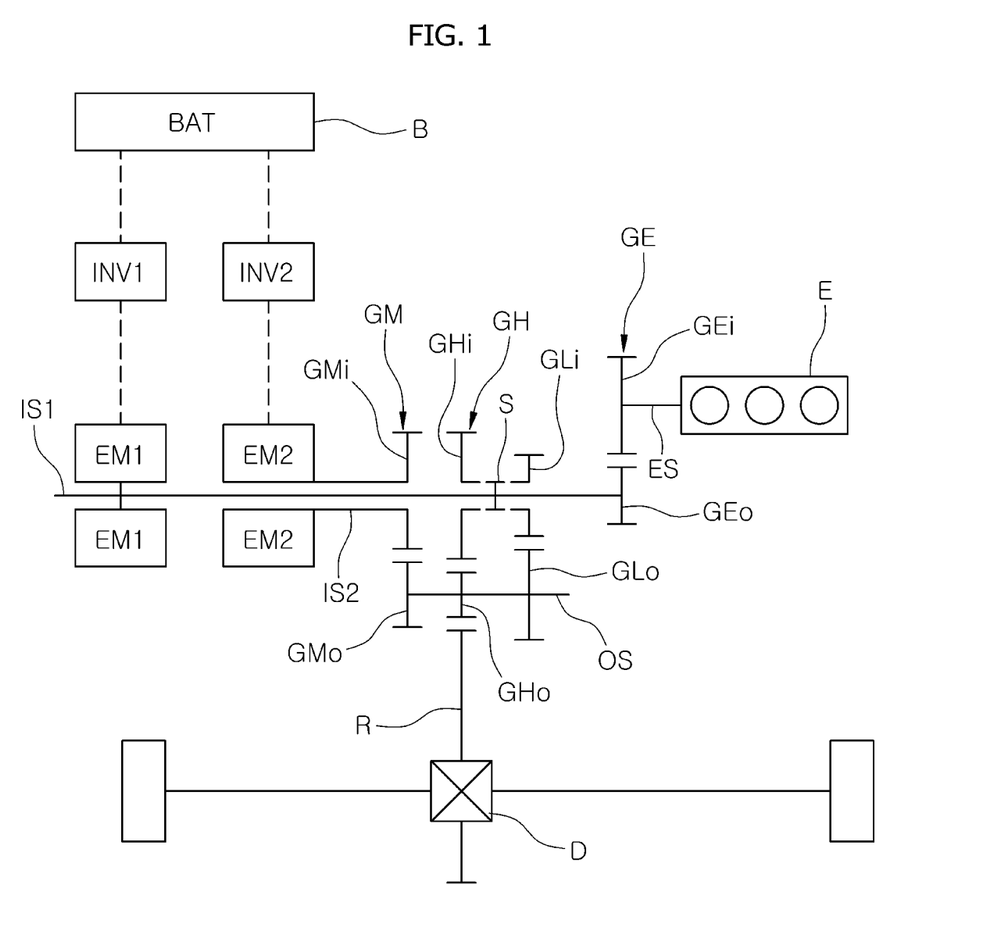
FIG. 1 is a schematic diagram illustrating a structure of a power train according to embodiments of the present disclosure.

FIG. 1 is a schematic diagram illustrating a structure of a power train according to embodiments of the present disclosure.

Referring to FIG. 1, the power train for a vehicle of embodiments of the present disclosure includes a first input shaft IS1 which receives rotating forces from a first motor EM1 and an engine E, a second input shaft IS2 which receives a rotating force from a second motor EM2, an output shaft OS disposed to be parallel to the first input shaft IS1 and the second input shaft IS2, a transmission gear set in which a plurality of gear sets having different gear ratios are engaged with and coupled to the first input shaft IS1 and the output shaft OS and a gear set suitable for a traveling speed is selected by a shifting unit S, and a motor-side transfer gear set GM engaged with and coupled to the second input shaft IS2 and the output shaft OS.

For example, inverters INV1 and INV2 are connected to the first motor EM1 and the second motor EM2, respectively, and a battery B is connected to the inverters INV1 and INV2, and thus electric power for driving the first motor EM1 and the second motor EM2 is applied thereto.

In particular, the first motor EM1 and the engine E are connected to the first input shaft IS1 so that the first input shaft IS1 is rotated according to driving of the first motor EM1 or the engine E, and the rotating force transmitted to the first input shaft IS1 is changed through the gearbox to a gear ratio suitable for a vehicle speed and transmitted to the output shaft OS.

In addition, the second motor EM2 is connected to the second input shaft IS2 so that the second input shaft IS2 is rotated according to driving of the second motor EM2, and the rotating force transmitted to the second input shaft IS2 is transmitted to the output shaft OS through the motor-side transfer gear set GM.

Accordingly, the rotating force, which is transmitted from the first input shaft IS1 and/or the first input shaft IS1 to the output shaft OS, is provided to a wheel to drive the vehicle in various traveling modes.

That is, during acceleration and ascending traveling, a gear set having a relatively large gear ratio is selected from among gear sets of the transmission gear set to increase the driving force and improve ascending performance.

In addition, when traveling at a high speed, it is possible to improve fuel efficiency of the vehicle through the efficient use of an operating point of the engine E, and it is possible to solve noise, vibration, and harshness (NVH) by reducing a rotating speed of the engine E.

In addition, through the formation of the engine E in a multi-stage manner, a capacity of the motor may be reduced based on the same power performance, thereby generally securing competitiveness of a production cost and a weight.

In addition, according to embodiments of the present disclosure, the first input shaft IS1 formed as a solid shaft is inserted into the second input shaft IS2 formed as a hollow shaft so that the first input shaft IS1 and the second input shaft IS2 are coaxially provided.

For example, the first input shaft IS1 is formed to be longer than the second input shaft IS2, and the second input shaft IS2 is in the form of being inserted in the middle of the first input shaft IS1.

In addition, the first motor EM1 is directly connected to one end of the first input shaft IS1, and the second motor EM2 is directly connected to one end of the second input shaft IS2 so that the first motor EM1 and the second motor EM2 may be disposed in one direction.

Preferably, a structure is formed such that the first motor EM1 and the second motor EM2 are sequentially disposed on one side of the first input shaft IS1 in a length direction so that a layout of an HEV structure specialized for a front wheel vehicle is provided.

Subsequently, the motor-side transfer gear set GM is disposed between the second motor EM2 and the transmission gear set, an input gear GMi of the motor-side transfer gear set GM is directly connected to the first input shaft IS1, and an output gear GMo of the motor-side transfer gear set GM is directly connected to the output shaft OS.

That is, the input gear GMi and the output gear GMo of the motor-side transfer gear set GM are directly connected to the other end of the first input shaft IS1 and one end of the output shaft OS, respectively, and the input gear GMi and the output gear GMo are circumscribedly engaged with each other so that the driving force of the second motor EM2 is transferred to the output shaft OS through the motor-side transfer gear set GM.

Meanwhile, according to embodiments of the present disclosure, the engine output shaft ES fixed to the engine E is engaged with and coupled to the other end of the first input shaft IS1 through an engine-side transfer gear set GE.

That is, it may be configured such that the engine E is directly connected to the first input shaft IS1 and thus the driving force provided from the engine E is directly transmitted to the first input shaft IS1. However, preferably, a gear set having a specific gear ratio may be connected between the engine E and the first input shaft IS1 to transmit the driving force of the engine E.

Specifically, a structure is formed such that an input gear GEi of the engine-side transfer gear set GE is directly connected to the engine output shaft ES, and an output gear GEo of the engine-side transfer gear set GE is directly connected to the first input shaft IS1.

That is, the input gear GEi and the output gear GEo of the engine-side transfer gear set GE are directly connected to the engine output shaft ES and the other end of the first input shaft IS1, respectively, and the input gear GEi and the output gear GEo are circumscribedly engaged with each other so that the driving force of the engine E is transferred to the first input shaft IS1 through the engine-side transfer gear set GE.

In addition, according to embodiments of the present disclosure, the transmission gear set is configured such that two gear sets having different gear ratios are provided and each of the two gear sets is selected according to a traveling condition of the vehicle.

Specifically, the transmission gear set may include a low gear set GL engaged with and coupled to the first input shaft IS1 and the output shaft OS, and a high gear set GH forms a gear ratio that is smaller than a gear ratio of the low gear set GL to be engaged with and coupled to the first input shaft IS1 and the output shaft OS.

Accordingly, a structure is formed such that the shifting unit S is fixed to the first input shaft IS1 and is selectively engaged with an input gear GLi of the low gear set GL and an input gear GHi of the high gear set GH.

Here, a synchro mechanism or a dog clutch, which has a hub and a sleeve, may be applied to shifting unit S, and the shifting unit S has a structure disposed between the input gear GLi of the low gear set GL and the input gear GHi of the high gear set GH.

That is, during the acceleration and the ascending traveling, the low gear set GL is selected through the shifting unit S to increase the driving force and improve the ascending performance. In contrast, during traveling at a high speed, the high gear set GH is selected through the shifting unit S to improve fuel efficiency of the vehicle and solve the NVH thereof through the efficient use of the operating point of the engine E.

As described above, by adding only one gear set having a different gear ratio to the transmission gear set to implement the formation of the engine E in a multi-stage manner, it is advantageous in terms of a package of the powertrain, and the synchro mechanism and the dog clutch, which may be simply controlled, are used as the shifting unit S to contribute to improvement of the fuel efficiency by maximizing efficiency of a transmission sector.

In addition, a structure is formed such that one of the output gears directly connected to the output shaft OS is engaged with and coupled to a ring gear R of a differential D.

Preferably, a structure is formed such that an output gear GHo of the high gear set GH is engaged with and coupled to the ring gear R of the differential D.

For example, the ring gear R is formed on an outer surface of the differential D and is circumscribedly engaged with the output gear GHo of the high gear set GH.

That is, in addition to the output gear GHo of the high gear set GH, an output gear GLo of the low gear set GL and the output gear GMo of the motor-side transfer gear set GM are directly connected to the output shaft OS.

Therefore, the rotating force transmitted through the high gear set GH is transmitted to the differential D through the output gear GHo of the high gear set GH. In addition, a rotational driving force, which is transmitted through the output gear GLo of the low gear set GL and the output gear GMo of the motor-side transfer gear set GM, is transmitted to the differential D through the output gear GHo of the high gear set GH.

In addition, according to embodiments of the present disclosure, a structure is formed such that the first motor EM1 is disposed on one side of the second motor EM2, the motor-side transfer gear set GM is disposed on the other side of the second motor EM2, the engine E is connected to the other end of the first input shaft IS1, and a transmission gear set is disposed between the motor-side transfer gear set GM and the engine E.

In addition, the engine-side transfer gear set GE may be disposed between the engine E and the transmission gear set.

That is, the first motor EM1, the motor-side transfer gear set GM, the transmission gear set, the engine-side transfer gear set GE, and the engine E are disposed in a length direction of the first input shaft IS1 to constitute a powertrain structure.

Hereinafter, a process of performing a gear shift by the powertrain structure of embodiments of the present disclosure will be described.

Figure 2:
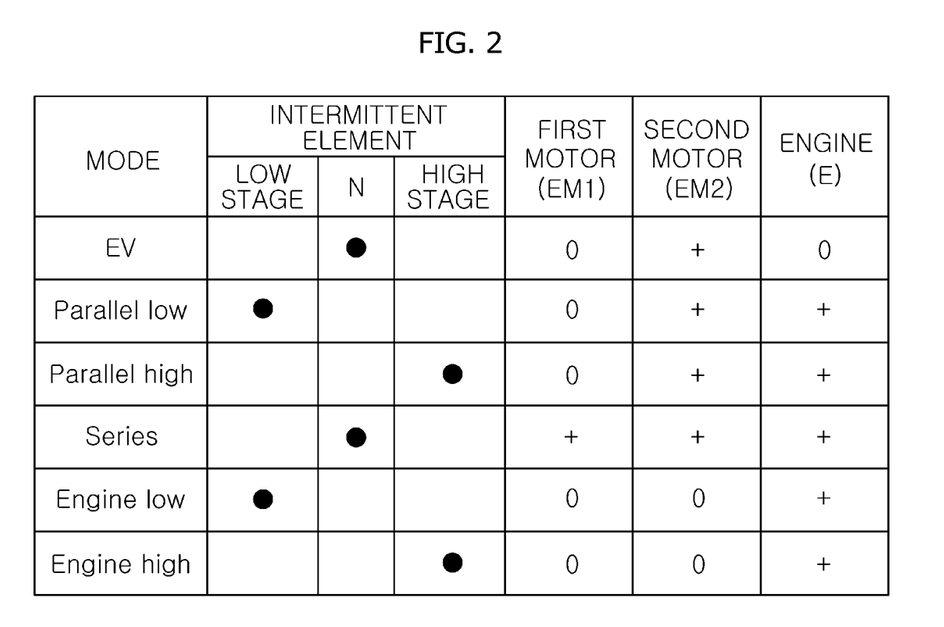
FIG. 2 is a table showing the summary of operating elements for each driving mode according to embodiments of the present disclosure.
Figure 3:
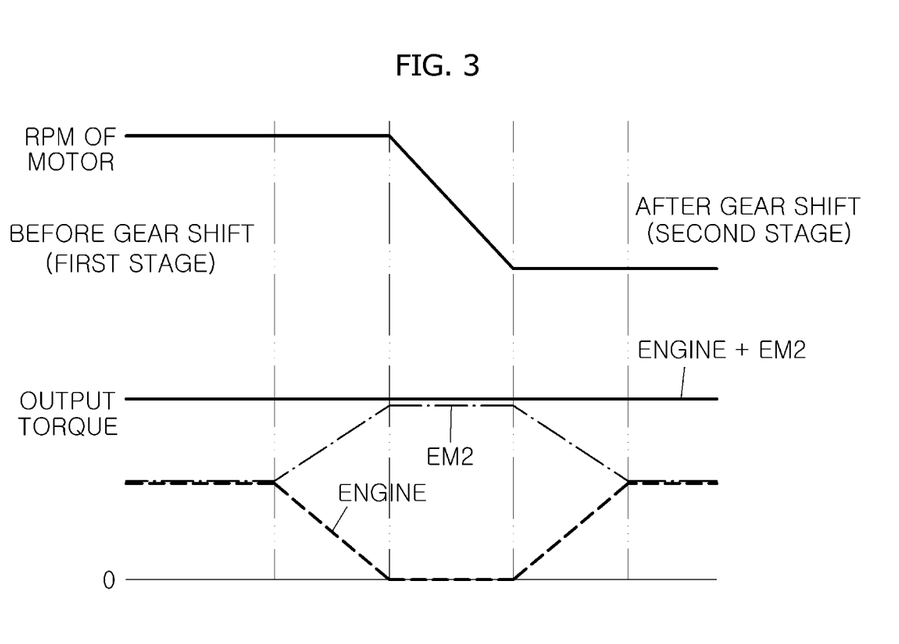
FIG. 3 is a diagram illustrating behaviors of a torque and a revolution per minute (RPM) when a gear shift is performed from a parallel low mode to a parallel high mode during traveling at a low load in embodiments of the present disclosure.

FIG. 2 is a table showing the summary of operating elements for each driving mode according to embodiments of the present disclosure, and FIG. 3 is a diagram illustrating behaviors of a torque and an RPM when a gear shift is performed from a parallel low mode to a parallel high mode when the vehicle is traveling at a low load.

Referring to the drawings, when the vehicle is traveling in a parallel low mode at a low load, as the low gear set GL is selected by the shifting unit S, the driving force of the engine E is provided to the output shaft OS through the low gear set GL.

In addition, as the driving force of the second motor EM2 is provided to the output shaft OS through the motor-side transfer gear set GM, a state in which an output torque is generated due to the driving forces of the engine E and the second motor EM2 occurs.

In this state, when a gear shift command to a parallel high mode is applied, an engine torque is reduced so as to allow a release operation of the shifting unit S from the input gear GLi of the low gear set GL to be smoothly performed, and a torque of the second motor EM2 is increased by as much as a reduction of a torque of the engine E, thereby maintaining an output torque before the gear shift command is applied.

Subsequently, the shifting unit S is released from the input gear GLi of the low gear set GL.

In addition, through controlling of an RPM of the first motor EM1, the number of revolutions of the first input shaft IS1 is synchronized with the input gear GHi of the high gear set GH, and then the shifting unit S is engaged with the input gear GHi of the high gear set GH to perform a gear shift.

Thereafter, while increasing the engine torque, the torque of the second motor EM2 is reduced by as much as the increase of the engine torque to directly maintain an output torque before the gear shift is performed, thereby completing the gear shift.

As described above, the torque of the second motor EM2 is continuously applied during the entire gear shift process while the vehicle is traveling at a low load, and the torque of the second motor EM2 is controlled according to the engine torque to constantly maintain the output torque so that a sense of torque disconnection occurring during the gear shift process may be solved.

Figure 4:
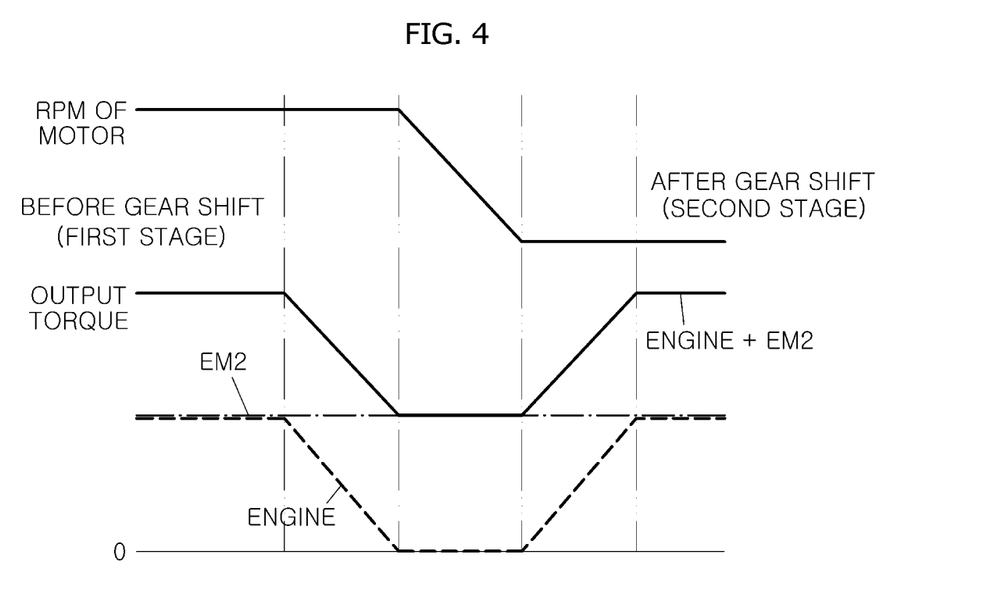
FIG. 4 is a diagram illustrating behaviors of a torque and an RPM when a gear shift is performed from a parallel low mode to a parallel high mode during traveling at a high load in embodiments of the present disclosure.

Meanwhile, FIG. 4 is a diagram illustrating behaviors of a torque and an RPM when a gear shift is performed from a parallel low mode to a parallel high mode during traveling at a high load in embodiments of the present disclosure.

Referring to the drawings, when the vehicle is traveling in a parallel low mode at a high load, as the low gear set GL is selected by the shifting unit S, the driving force of the engine E is provided to the output shaft OS through the low gear set GL.

In addition, as the driving force of the second motor EM2 is provided to the output shaft OS through the motor-side transfer gear set GM, a state in which the output torque is generated due to the driving forces of the engine E and the second motor EM2 occurs.

In this state, when a gear shift command to a parallel high mode is applied, the engine torque is reduced so as to allow a release operation of the shifting unit S from the input gear GLi of the low gear set GL to be smoothly performed, and the torque of the second motor EM2 is directly maintained.

Subsequently, the shifting unit S is released from the input gear GLi of the low gear set GL.

In addition, through controlling of an RPM of the first motor EM1, the number of revolutions of the first input shaft IS1 is synchronized with the input gear GHi of the high gear set GH, and then the shifting unit S is engaged with the input gear GHi of the high gear set GH to perform a gear shift.

Thereafter, the engine torque is increased and the second motor EM2 torque is directly maintained, thereby completing the gear shift.

As described above, by continuously maintaining the torque of the second motor EM2 to be constant regardless of whether the engine torque is increased or decreased during the entire gear shift process while the vehicle is traveling at a high load, the sense of gear shift disconnection occurring during the gear shift process is transmitted to a driver, thereby allowing the driver to feel a sporty driving feeling.

Meanwhile, in an EV mode shown in the operation table of FIG. 2, the second motor EM2 is driven in a state in which the shifting unit S is not selected in either the low gear set GL or the high gear set GH.

Accordingly, the driving force of the second motor EM2 is transmitted to the output shaft OS through the motor-side transfer gear set GM so that the vehicle may be driven in the EV mode.

Next, in a series mode, the engine E and the second motor EM2 are driven in a state in which the shifting unit S is not selected in either the low gear set GL or the high gear set GH.

Accordingly, the driving force of the second motor EM2 is transmitted to the output shaft OS through the motor-side transfer gear set GM.

In particular, in addition to the above description, the driving force of the engine E is transmitted to the first motor EM1 to generate electricity, and the generated electricity is charged in the battery B or transmitted to the second motor EM2 to be used to drive the second motor EM2, thereby driving the vehicle in the series mode. Thus, it possible to extend the vehicle to a range extender electric vehicle (REEV).

Next, in an engine low mode or an engine high mode, only the engine E is driven in a state in which the shifting unit S is selected in either the low gear set GL or the high gear set GH.

Accordingly, the driving force of the engine E is transmitted to the output shaft OS through the engine-side transfer gear set GE so that the vehicle may be driven in the engine low mode or the engine high mode.

As described above, according to embodiments of the present disclosure, through the formation of the engine E in a multi-stage manner, during acceleration and ascending traveling, the driving force of the vehicle may be increased and ascending performance may be improved, and when traveling at a high speed, it is possible to improve fuel efficiency of the vehicle through the efficient use of the operating point of the engine E, and it is possible to solve NVH by reducing the rotating speed of the engine E.

In addition, through the formation of the engine E in a multi-stage manner, a capacity of the motor may be reduced based on the same power performance, thereby generally securing competitiveness of a production cost and a weight of the vehicle.

In accordance with embodiments of the present disclosure, through formation of an engine in a multi-stage manner, during acceleration and ascending traveling, a driving force of a vehicle can be increased and ascending performance can be improved, and when traveling at a high speed, it is possible to improve fuel efficiency of the vehicle through the efficient use of an operating point of the engine, and it is possible to solve noise, vibration, harshness (NVH) by reducing a rotating speed of the engine.

In addition, through the formation of the engine in a multi-stage manner, there is an advantage in that a capacity of a motor can be reduced based on the same power performance, thereby generally securing competitiveness of a production cost and a weight of the vehicle.

Meanwhile, although the present disclosure has been described in detail with respect to only the above described specific examples, it is obvious to those skilled in the art that various modifications and alternations are possible within the technical scope of the present disclosure, and it is natural that such modifications and alternations fall within the appended claims.

What is claimed is:

1. A power train for a vehicle, the power train comprising:
a first input shaft configured to receive rotating forces from a first motor and an engine, wherein the first motor is directly connected to an end of the first input shaft;
a second input shaft configured to receive a rotating force from a second motor, wherein the second motor is directly connected to an end of the second input shaft such that the first motor and the second motor are disposed in one direction;
an output shaft disposed in parallel with the first input shaft and the second input shaft;
a transmission gear set in which a plurality of gear sets having different gear ratios are engaged with and coupled to the first input shaft and the output shaft;
a shifting unit configured to select a gear set of the plurality of gear sets based on a traveling speed of the vehicle; and
a motor-side transfer gear set engaged with and coupled to the second input shaft and the output shaft.

2. The power train of claim 1, wherein the first input shaft comprises a solid shaft and the second input shaft comprises a hollow shaft, and wherein the first input shaft is inserted into the second input shaft.

3. The power train of claim 2, wherein the first input shaft and the second input shaft are coaxially arranged.

4. The power train of claim 1, wherein:
an input gear of the motor-side transfer gear set is directly connected to the second input shaft; and
an output gear of the motor-side transfer gear set is directly connected to the output shaft.

5. The power train of claim 1, further comprising an engine output shaft fixed to the engine, wherein the engine output shaft is engaged with and coupled to an end of the first input shaft by an engine-side transfer gear set.

6. The power train of claim 5, wherein:
an input gear of the engine-side transfer gear set is directly connected to the engine output shaft; and
an output gear of the engine-side transfer gear set is directly connected to the first input shaft.

7. The power train of claim 1, wherein:
the first motor is disposed on a first side of the second motor;
the motor-side transfer gear set is disposed on a second side of the second motor;
the engine is connected to an end of the first input shaft; and
the transmission gear set is disposed between the motor-side transfer gear set and the engine.

8. A power train for a vehicle, the power train comprising:
a first input shaft configured to receive rotating forces from a first motor and an engine;
a second input shaft configured to receive a rotating force from a second motor;
an output shaft disposed in parallel with the first input shaft and the second input shaft;
a transmission gear set in which a plurality of gear sets having different gear ratios are engaged with and coupled to the first input shaft and the output shaft, wherein the transmission gear set comprises:
a low gear set engaged with and coupled to the first input shaft and the output shaft; and
a high gear set configured to form a gear ratio that is smaller than a gear ratio of the low gear set and is engaged with and coupled to the first input shaft and the output shaft;
a shifting unit configured to select a gear set of the plurality of gear sets based on a traveling speed of the vehicle, wherein the shifting unit is fixed to the first input shaft and selectively engaged with an input gear of the low gear set and an input gear of the high gear set; and
a motor-side transfer gear set engaged with and coupled to the second input shaft and the output shaft.

9. The power train of claim 8, wherein one of an output gear of the low gear set or an output gear of the high gear set directly connected to the output shaft is engaged with and coupled to a ring gear of a differential.

10. The power train of claim 8, wherein an output gear of the high gear set is engaged with and coupled to a ring gear of a differential.

11. A vehicle comprising:
a first motor;
a second motor;
an engine;
a first input shaft configured to receive rotating forces from the first motor and the engine, wherein the first motor is directly connected to an end of the first input shaft;
a second input shaft configured to receive a rotating force from the second motor, wherein the second motor is directly connected to an end of the second input shaft such that the first motor and the second motor are disposed in one direction;
an output shaft disposed in parallel with the first input shaft and the second input shaft;
a transmission gear set in which a plurality of gear sets having different gear ratios are engaged with and coupled to the first input shaft and the output shaft;
a shifting unit configured to select a gear set of the plurality of gear sets based on a traveling speed of the vehicle; and
a motor-side transfer gear set engaged with and coupled to the second input shaft and the output shaft.

12. The vehicle of claim 11, wherein the first input shaft comprises a solid shaft and the second input shaft comprises a hollow shaft, wherein the first input shaft is inserted into the second input shaft, and wherein the first input shaft and the second input shaft are coaxially arranged.

13. The vehicle of claim 11, further comprising an engine output shaft fixed to the engine, wherein the engine output shaft is engaged with and coupled to an end of the first input shaft by an engine-side transfer gear set.

14. The vehicle of claim 11, wherein:
the first motor is disposed on a first side of the second motor;
the motor-side transfer gear set is disposed on a second side of the second motor;
the engine is connected to an end of the first input shaft; and
the transmission gear set is disposed between the motor-side transfer gear set and the engine.

15. The vehicle of claim 11, wherein the transmission gear set comprises:
a low gear set engaged with and coupled to the first input shaft and the output shaft; and
a high gear set configured to form a gear ratio that is smaller than a gear ratio of the low gear set and is engaged with and coupled to the first input shaft and the output shaft, wherein the shifting unit is fixed to the first input shaft and selectively engaged with an input gear of the low gear set and an input gear of the high gear set.

16. The vehicle of claim 15, wherein one of an output gear of the low gear set or an output gear of the high gear set directly connected to the output shaft is engaged with and coupled to a ring gear of a differential.

17. The vehicle of claim 15, wherein an output gear of the high gear set is engaged with and coupled to a ring gear of a differential.

* * * * *